United States Patent [19]

Steeby et al.

[11] Patent Number: 5,761,628
[45] Date of Patent: Jun. 2, 1998

[54] START GEAR RATIO CONTROL SYSTEM AND METHOD UTILIZING THE HIGHEST ALLOWABLE START GEAR RATIO

[75] Inventors: Jon A. Steeby, Schoolcraft; Warren R. Dedow, Portage, both of Mich.

[73] Assignee: Eaton Corporation, Cleveland, Ohio

[21] Appl. No.: 329,818

[22] Filed: Oct. 27, 1994

[51] Int. Cl.$^6$ .................. G06G 7/70; B60K 41/24
[52] U.S. Cl. .................. 701/64; 701/51; 701/52; 701/66; 74/336 R; 74/335; 479/78; 479/80
[58] Field of Search .................. 364/424.1, 424.01; 477/78, 70, 124, 120, 75, 63, 65, 154, 155, 85, 904, 80, 142; 74/375, 475, DIG. 7, 335, 336 R; 192/3.63, 3.3, 3.31, 109 F, 3.58; 475/127, 158; 701/51, 52, 64, 62

[56] References Cited

U.S. PATENT DOCUMENTS

| | | | |
|---|---|---|---|
| 4,648,290 | 3/1987 | Dunkley et al. | 477/78 |
| 4,735,109 | 4/1988 | Richards et al. | 74/745 |
| 4,754,665 | 7/1988 | Vandervoort | 74/745 |
| 4,841,447 | 6/1989 | Hayashi | 364/431.01 |
| 4,930,078 | 5/1990 | Dunkley et al. | 364/424.1 |
| 4,930,081 | 5/1990 | Dunkley et al. | 364/424.1 |
| 5,081,588 | 1/1992 | Holmes et al. | 364/424.1 |
| 5,385,515 | 1/1995 | Chan et al. | 477/75 |
| 5,408,895 | 4/1995 | Chan et al. | 74/335 |
| 5,415,604 | 5/1995 | Bates et al. | 477/78 |
| 5,416,700 | 5/1995 | Bates et al. | 364/424.1 |
| 5,506,771 | 4/1996 | Chan et al. | 701/54 |
| 5,527,237 | 6/1996 | Fowler et al. | 477/142 |
| 5,577,978 | 11/1996 | Stasik et al. | 477/78 |
| 5,592,851 | 1/1997 | Bates et al. | 74/336 R |

*Primary Examiner*—Jacques H. Louis-Jacques
*Attorney, Agent, or Firm*—Howard D. Gordon

[57] ABSTRACT

A control system and method for controlling start-from-stop operation in an automated mechanical transmission system, including a multiple-speed change-gear transmission (10) having a lowest grouping of ratios (first-fourth) suitable for start-from-stop operation, is provided. Upon a request or requirement for a shift into a default start ratio, the system controller (106) will cause initiation of a shift into the highest gear ratio (fourth) of the lowest group of ratios.

4 Claims, 3 Drawing Sheets

START GEAR RATIO CONTROL SYSTEM AND METHOD UTILIZING THE HIGHEST ALLOWABLE START GEAR RATIO

BACKGROUND OF THE INVENTION

1. Related Applications

This application is related to published European Patent Application No. 0585020A3, titled START GEAR RATIO CONTROL SYSTEM AND METHOD, which claims priority from U.S. patent application Ser. No. 07/935,937, co-pending with this application, now U.S. Pat. No. 5,506,771 all assigned to the same assignee, EATON CORPORATION, as this application.

2. Field of the Invention

The present invention relates to a control system and method for an automated mechanical transmission system, including a manually operated shift selector, for at least partially automatically controlling the changing or shifting of transmission gear ratios on a vehicle, while leaving the vehicle driver or operator some residual measure of control. In particular, the present invention relates to a control system and method for the at least partially automatic control of a mechanical change gear transmission including means for at least partially automatically executing allowable driver- and/or controller-selected transmission ratio shifts. More particularly, the present invention relates to a system and method for controlling an at least partially automated mechanical transmission system wherein various operator actions and/or system conditions, such as, for example, a single downshift request made at a time when the vehicle is at rest, or an attempt to launch the vehicle when stopped in the "hold" condition and in a relatively high ratio, are interpreted as a request and/or requirement for a direct shift into a preselected start ratio.

More particularly yet, the present invention relates to fully or partially automated mechanical transmission system having a plurality of available start-from-stop ratios and at least one mode of operation to shift directly into a preselected default start ratio wherein the preselected default start ratio is the highest of the plurality of start ratios.

3. Description of the Prior Art

Fully automatic mechanical transmission systems, usually associated with heavy-duty vehicles such as heavy-duty trucks and/or coaches, that sense throttle positions, vehicle speeds, engine speeds and the like, and automatically shift the vehicle transmission in accordance therewith, are well known in the prior art. Such automated mechanical transmission systems typically include a multiple-speed mechanical transmission driven by an internal combustion engine through a non-positive coupling and utilize electronic, hydraulic and/or pneumatic logic and actuators to engage and disengage mechanical (i.e., positive) clutches to achieve a desired gear ratio. Examples of such transmissions may be seen by reference to U.S. Pat. Nos. 3,961,546; 4,081,065; 4,361,060; 5,050,079 and 5,109,729, the disclosures of which are hereby incorporated by reference.

It is known to provide a semi-automatic mechanical transmission control wherein automatic changing between a plurality of gear ratios is provided while normally permitting the driver to choose when to make a particular gear ratio change and whether to select the immediately consecutive ratio up or down or to skip one or more ratios. Furthermore, the semi-automatic control system prohibits engagement of a driver selected higher ratio (i.e., an upshift) that would cause the engine speed to decrease below the idle speed (i.e., would cause stalling and/or over-stressing at low speeds of the engine) and of a lower ratio (i.e., a downshift) if such a change would cause over-speeding of the engine. Examples of such a semi-automatic transmission control can be seen by reference to U.S. Pat. Nos. 4,648,290; 4,800,360; 4,930,081 and 4,930,078, the disclosures of which are incorporated herein by reference, and to aforementioned published European Patent Application No. 0585020A3.

While the above-described semi-automatic mechanical transmission control does provide a very desirable semi-automatic control, the control was subject to improvement as, if the driver or operator desired a shift into a selected transmission start ratio while the vehicle was at rest, the driver was required to identify the currently engaged ratio, to calculate the number of steps from the currently engaged ratio to the selected start ratio and to then move the selector lever that number of times in the upshift downshift direction. This was particularly a concern in modern mechanical transmissions for heavy-duty vehicles which may have 9, 10, 12, 13, 16 or 18 forward speed ratios and wherein up to any one of the first seven ratios may be appropriate start ratios under certain conditions. Examples of such multi-speed mechanical transmissions may be seen by reference to U.S. Pat. Nos. 4,735,109 and 4,754,665, the disclosures of which are incorporated herein by reference.

The drawbacks of the prior art semi-automatic mechanical transmission control have been minimized by the provision of controls and control methods wherein the control unit will interpret various combinations of vehicle conditions and operator actions as a request for a downshift or upshift directly into a selected default start ratio. If the vehicle operator was not satisfied with the default ratio, the operator could then shift from the preselected default ratio into any allowable start-from-stop ratio.

Similarly, on partially or fully automated mechanical transmission systems having a "hold" or "H" mode of operation wherein the transmission was maintained (or held) on its existing currently engaged ratio, with shifts therefrom requiring manual operator selection by an up/down selector, if the vehicle was brought to rest in the "hold" mode with a relatively high ratio engaged, upon an attempted start-from-stop vehicle launch, the transmission would be shifted automatically to a default start ratio to prevent undesirably high loading on the drivetrain components. Examples of these types of transmission systems may be seen by reference to U.S. Pat. Nos. 5,274,553 and 5,323,669, the disclosures of which are incorporated herein by reference.

While the aforementioned controls are improvements, these controls are not totally satisfactory as the preselected default start ratio may not be the specific start ratio desired by the operator in view of desired vehicle performance, vehicle loading, operating terrain, weather conditions and the like.

SUMMARY OF THE INVENTION

In accordance with the present invention, the drawbacks of the prior art are overcome or minimized by the provision of a control system and method for selecting a specific ratio as a predetermined default start ratio from a plurality of available start-from-stop ratios, wherein the selected specific default start ratio is the highest available start ratio.

It has been found, especially in situations in which the vehicle is operated in the "hold" mode, that it is likely that the operator desires a minimum of shifting and that conditions requiring a relatively low start gear probably are not present. In such event, if a shift to a default start ratio is requested or required, setting the highest available start ratio as the default ratio will most likely meet the operator's requirements.

Accordingly, it is an object of the present invention to provide a new and improved control system/method for at least partially automated mechanical transmission systems which, upon sensing a selection of and/or a requirement for a shift into an allowable start-from-stop ratio, will select the highest allowable start ratio as the default start ratio.

This and other objects and advantages of the present invention will become apparent from a reading of the following description of the preferred embodiments taken in connection with the attached drawings.

BRIEF DESCRIPTION OF THE DRAWINGS

FIG. 2A is an elevational view of the driver control for the automated transmission system of FIG. 2.

DESCRIPTION OF THE PREFERRED EMBODIMENT

Certain terminology will be used in the following description for convenience in reference only and will not be limiting. The term "compound transmission" is used to designate a change speed or change gear transmission having a multiple forward speed main transmission section and a multiple speed auxiliary transmission section connected in series whereby the selected gear reduction in the main transmission section may be compounded by further selected gear reduction in the auxiliary transmission section. "Synchronized clutch assembly" and words of similar import shall designate a clutch assembly utilized to non-rotatably couple a selected gear to a shaft by means of a positive clutch in which attempted engagement of said clutch is prevented until the members of the clutch are at substantially synchronous rotation in a relatively large capacity friction means are utilized with the clutch members and are sufficient, upon initiation of a clutch engagement, to cause the clutch members and all members rotating therewith to rotate at substantially synchronous speed.

The term "upshift" as used herein, shall mean the shifting from a lower speed gear ratio into a higher speed gear ratio. The term "downshift" as used herein, shall mean the shifting from a higher speed gear ratio to a lower speed gear ratio. The terms "low speed gear", "low gear" and/or "first gear" as used herein, shall all designate the gear ratio utilized for lowest forward speed operation in a transmission or transmission section (i.e., that set of gears having the highest ratio of reduction relative to the input shaft of the transmission).

The terms "start ratio(s)" and "start-from-stop ratio(s)" refer to a transmission ratio or group of ratios predetermined to be suitable for use in launching a vehicle from a stopped condition.

The term "automatic shift initiation" is intended to apply to initiation of fully automatic shifts as seen in above-mentioned U.S. Pat. Nos. 4,361,060 and 5,109,721, to initiation of fully automatic shifts in only selected groupings of ratios as seen in above-mentioned U.S. Pat. No. 4,722,248 and to automatic preselection of a shift and/or issuing of a shift prompt as seen in above-mentioned U.S. Pat. Nos. 5,053,961 and 5,053,962.

Signals indicative of engine speed will include signals from engine speed sensors, signals from input shaft speed sensors, and signals such as output shaft and gear ratio signals which may be used to calculate (ES=OS*GR) and/or estimate engine speed.

Figure 1:
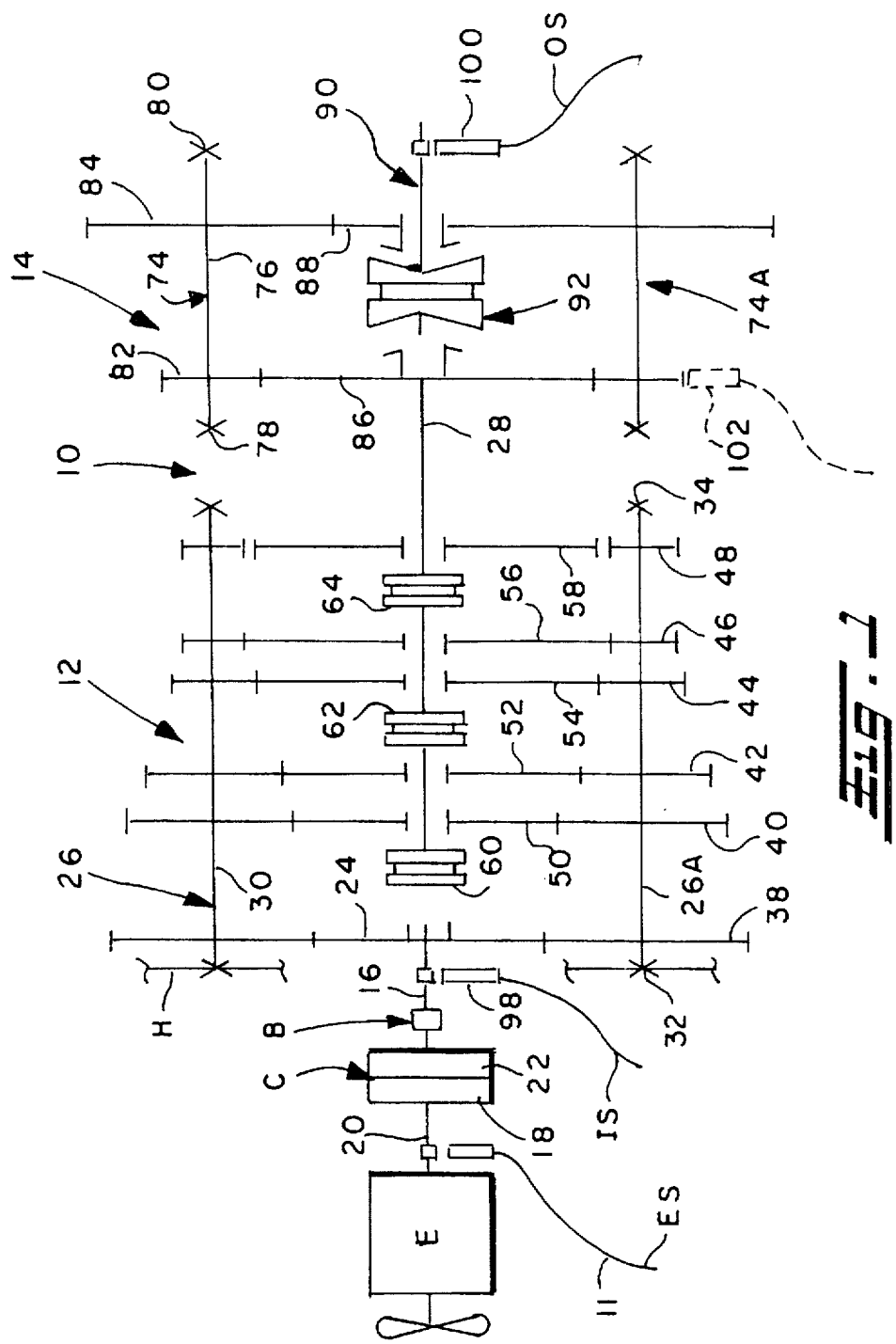
FIG. 1 is a schematic illustration of a partially automated vehicular mechanical transmission system advantageously utilizing the present invention.

Referring to FIG. 1, a range type compound transmission 10 of the type partially automated by the semi-automatic mechanical transmission system of the present invention is illustrated. Compound transmission 10 comprises a multiple speed main transmission section 12 connected in series with a range type auxiliary section 14. Transmission 10 is housed within a housing H and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

The engine E is fuel throttle controlled by a manually or automatically controlled throttle device (not shown) and the master clutch C is manually controlled by a clutch pedal (not shown) or automatically controlled by a clutch actuator, or the like. An input shaft brake B, usually operated by over-travel of the clutch pedal, is preferably provided to provide quicker upshifting as is well known in the prior art.

Transmissions similar to compound mechanical transmission 10 are well known in the prior art and may be appreciated by reference to U.S. Pat. Nos. 3,105,395; 3,283,613; 4,735,109 and 4,754,665, the disclosures of which are incorporated herein by reference. A sensor 11 may be provided for sensing the rotational speed of the engine and providing a signal indicative thereof.

In main transmission section 12, the input shaft 16 carries an input gear 24 for simultaneously driving a plurality of substantially identical countershaft assemblies 26 and 26A at substantially identical rotational speeds. The two substantially identical countershaft assemblies are provided on diametrically opposite sides of mainshaft 28 which is generally coaxially aligned with the input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42, 44, 46 and 48, fixed for rotation therewith. A plurality of mainshaft gears 50, 52, 54, 56 and 58 surround the mainshaft 28 and are selectively clutchable, one at a time, to the mainshaft 28 for rotation therewith by sliding clutch collars 60, 62 and 64 as is well known in the prior art. Clutch collar 60 may also be utilized to clutch input gear 24 to mainshaft 28 to provide a direct drive relationship between input shaft 16 and mainshaft 28.

Typically, clutch collars 60, 62 and 64 are axially positioned by means of shift forks associated with the shift housing assembly 70, as well known in the prior art. Clutch collars 60, 62 and 64 may be of the well known acting nonsynchronized double acting jaw clutch type.

Shift housing or actuator 70 may be actuated by electric motors or by compressed fluid, such as compressed air, and is of the type automatically controllable by a control unit as may be seen by reference to U.S. Pat. Nos. 4,445,393; 4,555,959; 4,361,060; 4,676,115; 4,873,881 and 4,899,607, the disclosures of which are incorporated herein by reference.

Mainshaft gear 58 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio, namely that provided by drivingly connecting mainshaft drive gear 56 to mainshaft 28, is often of such a high gear reduction it has to be considered a low or "creeper" gear which is utilized only for starting of a vehicle under severe conditions and is not usually utilized in the high transmission range. Accordingly, while main transmission section 12 does provide five forward speeds, it is usually referred to as a "four plus one" main section as only four of the forward speeds are compounded by the auxiliary range transmission section 14 utilized therewith. Similar transmissions provide 9, 10, 13, 16 or 18 forward speeds as may be seen by reference to U.S. Pat. No. 4,754,665 and 4,974,468.

Jaw clutches 60, 62, and 64 are three-position clutches in that they may be positioned in the centered, nonengaged position as illustrated, or in a fully rightwardly engaged or fully leftwardly engaged position by means of actuator 70. As is well known, only one of the clutches 60, 62 and 64 is engageable at a given time and main section interlock means (not shown) are provided to lock the other clutches in the neutral condition.

Auxiliary transmission range section 14 includes two substantially identical auxiliary countershaft assemblies 74 and 74A, each comprising an auxiliary countershaft 76 supported by bearings 78 and 80 in housing H and carrying two auxiliary section countershaft gears 82 and 84 for rotation therewith. Auxiliary countershaft gears 82 are constantly meshed with and support range/output gear 86 while auxiliary section countershaft gears 84 are constantly meshed with output gear 88 which is fixed to transmission output shaft 90.

A two-position synchronized jaw clutch assembly 92, which is axially positioned by means of a shift fork (not shown) and the range section shifting actuator assembly 96, is provided for clutching either gear 86 to mainshaft 28 for low range operation or gear 88 to mainshaft 28 for direct or high range operation of the compound transmission 10.

Range section actuator 96 may be of the type illustrated in U.S. Pat. Nos. 3,648,546; 4,440,037 and 4,614,126, the disclosures of which are hereby incorporated by reference.

Although the range type auxiliary section 14 is illustrated as a two-speed section utilizing spur or helical type gearing, it is understood that the present invention is also applicable to simple transmissions and to range type transmissions utilizing combined splitter/range type auxiliary sections, having three or more selectable range ratios and/or utilizing planetary type gearing. Also, any one or more of clutches 60, 62 or 64 may be of the synchronized jaw clutch type and transmission sections 12 and/or 14 may be of the single countershift type. Further, the present invention is also applicable to automated transmissions utilizing friction clutches rather than jaw clutches to engage selected ratios.

Figure 2:
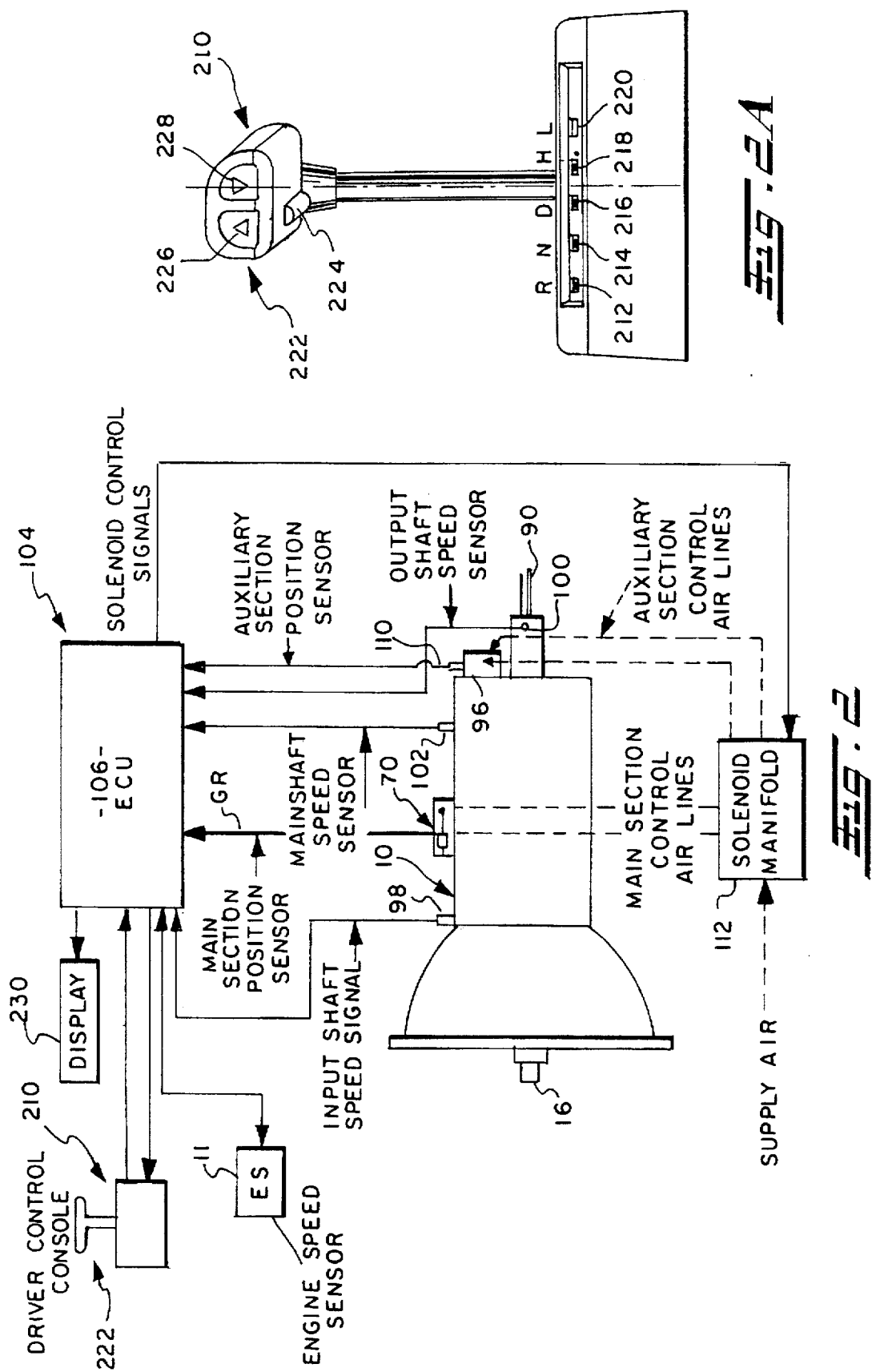
FIG. 2 is a schematic illustration of a partially automatic shift implementation system for a mechanical transmission system advantageously utilizing the present invention.

The semi-automatic shift implementation control system 104 for a mechanical transmission system of the present invention is schematically illustrated in FIG. 2. Control system 104, in addition to the mechanical transmission system 10 described above, includes an electronic control unit 106, preferably microprocessor based, for receiving input signals from the engine speed sensor 11, input shaft speed sensor 98, from the output shaft speed sensor 100 (or, alternatively, the mainshaft speed sensor 102) and from the driver control console 108. The ECU 106 may also receive inputs from an auxiliary section position sensor 110. ECU 106 may communicate with the engine E by means of an electronic data bus such as those conforming to SAE J1922 or J1939 protocols.

The ECU is effective to process the inputs in accordance with predetermined logic rules to issue issue command output signals to a transmission operator, such as solenoid manifold 112 which controls the mainsection section actuator 70 and the auxiliary section actuator 96, and to the driver control console 108. ECU's of this type are well known in the prior art as may be seen by reference to U.S. Pat. No. 4,595,986, the disclosure of which is incorporated herein by reference.

The driver control and display console allows the operator to select a manual or hold mode of operation for manually selecting a shift in a given direction (i.e., upshifts or downshifts) or to neutral from the currently engaged ratio, or to select a semi-automatic preselect mode of operation, and preferably provides a display 230 for informing the operator of the current mode of operation (automatic or manual preselection of shifting), the current transmission operation condition (forward, reverse or neutral) and of any ratio change or shift (upshift, downshift or shift to neutral) which has been preselected but not yet implemented.

The control console 210 is illustrated in FIG. 2A. Briefly, a mode selector 210 is utilized to select reverse (R) 212, neutral (N) 214, drive (automatic) (D) 216, hold (manual) (H) 218 and low (L) 220. The mode selector includes a handle 222 having a reverse interlock release button 224 and upshift 226 and downshift 228 selection buttons. Other types of controls, such as controls utilizing pushbuttons and/or joy sticks, may also be utilized.

To implement a selected shift, the manifold 112 is preselected to cause actuator 70 to be biased to shift main transmission section 12 into neutral. This is accomplished by the operator causing a torque break or reversal by manually momentarily decreasing and/or increasing the supply of fuel to the engine and/or manually disengaging the master clutch C. As the transmission is shifted into neutral, neutral is verified by the ECU (neutral sensed for a period of time such as 1.5 seconds). If the selected shift is a compound shift (i.e., a shift of both the main section 12 and of the range section 14, such as a shift from 4th to 5th speeds as seen in FIG. 1), the ECU will issue issue command output signals to manifold 112 to cause the auxiliary section actuator 96 to complete the range shift after neutral is sensed in the front box.

When the range auxiliary section is engaged in the proper ratio, the ECU will calculate or otherwise determine, and continue to update, an enabling range or band of input shaft speeds, based upon sensed output shaft (vehicle) speed and the ratio to be engaged, which will result in an acceptably synchronous engagement of the ratio to be engaged. As the operator, or a control unit, by fuel manipulation and/or use of the input shaft brake, causes the input shaft speed to fall within the acceptable range, the ECU 106 will issue issue command output signals to manifold 112 to cause actuator 70 to engage the mainsection ratio to be engaged. Preferably, the actuator will respond very quickly not requiring the operator to maintain the input shaft speed within the acceptable range for an extended period of time.

In the control algorithms, the issuing of command output signals for engagement of a target gear is dependent upon the transmission (i.e., the input shaft) being manually brought to within an acceptable synchronous point. This synchronous point is usually a range of RPMs (error band) centered about an error of zero RPM (i.e., when input shaft speed equals the product of output shaft speed times the numerical value of the target gear ratio, $IS=OS*GR_T$). When the control electronics sense that the input shaft speed falls within the error band it will fire the solenoid of manifold 112 that will cause the target gear to be engaged. The error bands are selected to give the best shift quality for each gear ratio. These error bands are usually stored in software in the form of tables that are indexed as a function of target gear. When these tables are set up for best shift quality the bands must be made small to minimize "clunking" as the target gear is engaged. With small error bands it is more difficult for the driver to bring the transmission to the correct synchronous point and he may miss it altogether and end up in neutral.

Above-mentioned U.S. Pat. No. 5,063,511 provided a missed shift recovery algorithm that will access a second set of tables a short time after neutral has been sensed (one second). In a normal shift, one second is ample time for the driver to have brought the transmission to the synchronous point. If the neutral state has existed for more than the allowed time the algorithms will assume the driver has missed the shift and call for the new set of tables. This second set of tables will open the error bands to allow for a harsher shift which enhances the probability that the driver's efforts will result in engagement of the target gear instead of remaining in a neutral state.

In the automatic preselection mode of operation, selected by moving selector 210 to the "D" position, the ECU will, based upon stored logic rules, currently engaged ratio (which may be position sensed and/or calculated by comparing input shaft to output shaft speed) and output shaft speed, determine if an upshift or a downshift is required and preselect same.

In the "hold" mode of operation, selected by moving selector 210 to the "H" position, the ECU normally will not initiate shifts from the currently engaged ratio unless manually requested by the operator utilizing the upshift 226 and downshift 228 selector buttons.

Although the present invention is described in connection with the partially automated mechanical transmission system illustrated in FIGS. 1, 2 AND 2A, it also is applicable to other types of at least partially automated mechanical transmission systems, such as, for example, the systems illustrated in aforementioned U.S. Pat. Nos. 4,361,060; 4,648,290 and 4,930,078, and published European Patent Application No. 0585020A3.

As is known for multiple-speed compound mechanical transmissions typically having 9, 10, 12, 13, 16, 18 or 20 forward speed ratios, the lower 4, 5, 6 or 7 ratios may be considered permissible start ratios. By way of example, in 9-forward-speed transmission 10, the lower four ratios (i.e., first, second, third and fourth speeds) all may be permissible start ratios. The actual ratio utilized usually is a function of vehicle loading, vehicle operating conditions and/or operator preferences.

For operator convenience, to provide acceptable performance and to protect the drivetrain from undesirably high loading, if the vehicle is operating with the transmission in a relatively high ratio (i.e., not a start ratio) and in the "hold" mode, and is brought to a stop and then subjected to a start-from-stop operation, the ECU 106 will immediately, automatically initiate a shift to a default start-from-stop ratio.

In accordance with the present invention, the default start-from-stop ratio is the highest allowable start ratio (i.e., fourth speed for the transmission system of FIGS. 1 AND 2). Driver satisfaction is believed to be enhanced by utilizing the highest allowable start ratio.

If the operator chooses to start in a ratio lower than the default ratio, a downshift thereto may be selected by use of downshift selection button 228. Similarly, if the system's logic permits start-from-stop in a non-start ratio, a shift into a ratio higher than the default start ratio may be selected by use of upshift selection button 226.

Figure 3:
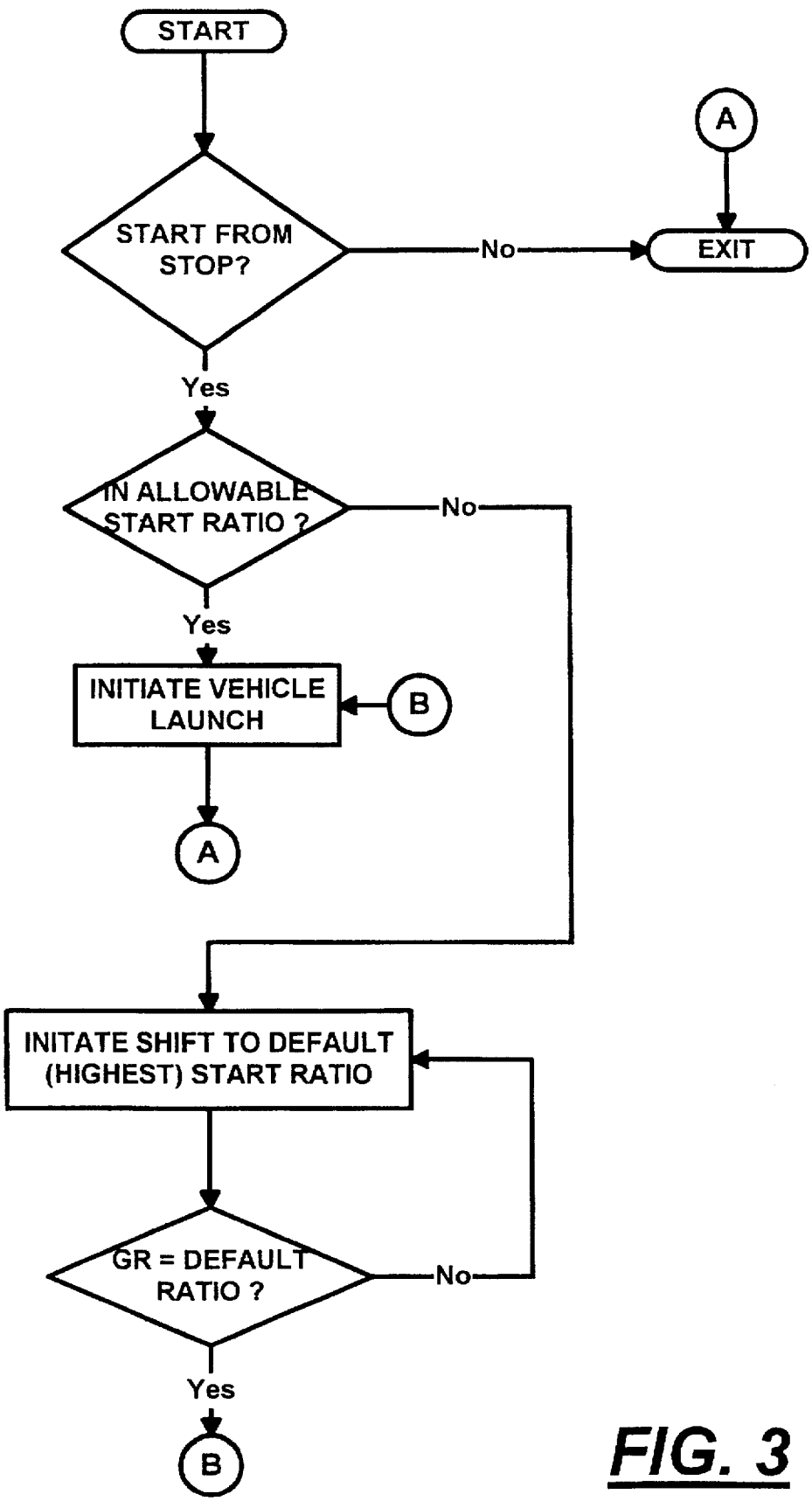
FIG. 3 is a schematic illustration, in flowchart format, of the present invention.

The start-from-stop control system/method of the present invention is schematically illustrated, in flow chart format, in FIG. 3.

Although the present invention has been described with a certain degree of particularity, it is understood that various changes to form and detail may be made without departing from the spirit and the scope of the invention as hereinafter claimed.

We claim:

1. A method of controlling a vehicular automated mechanical change-gear transmission system comprising a fuel throttle-controlled engine (E), a multi-speed change-gear mechanical transmission (10) having a lowest grouping of gear ratios (first-fourth) suitable for start-from-stop operation and having a specific ratio within said lowest grouping of ratios determined to be a predetermined start ratio, a manually operated shift selection device (210), a central processing unit (106) for receiving inputs including signals indicative of engaged transmission ratio (GR), vehicle speed (OS) and operation in a hold (H) mode of operation and for processing same according to predetermined logic rules to issue command output signals to non-manually controlled operators including a transmission operator (112), said processing unit sensing operation of said manual shift selection device and system parameters indicative of start-from-stop operation while engaged in a non-start ratio, operation in said hold mode of operation, and one of (i) a selection of and (ii) a requirement for a shift directly into the predetermined start ratio, said method comprising:

utilizing the highest ratio (fourth) of said lowest grouping of gear ratios as the predetermined start ratio.

2. The method of claim 1 wherein said selection device (210) includes means (226, 228) for selecting upshifts and downshifts and said system parameters comprise signals indicative of selection of a downshift from a non-start ratio with the vehicle substantially at rest.

3. A system of controlling a vehicular automated mechanical change-gear transmission system comprising a fuel throttle-controlled engine, a multi-speed change-gear mechanical transmission having a lowest grouping of gear ratios suitable for start-from-stop operation and having a specific ratio within said lowest grouping of ratios determined to be a predetermined start ratio, a manually operated shift selection device, a central processing unit for receiving inputs including signals indicative of engaged transmission ratio (GR), vehicle speed (OS) and operation in a hold (H) mode of operation and for processing same according to predetermined logic rules to issue command output signals to non-manually controlled operators including a transmission operator, said processing unit sensing operation of said manual shift selection device and system parameters to sense start-from-stop operation while engaged in a non-start ratio, operation in said hold mode of operation, and at least one of (i) a selection of and (ii) a requirement for a shift directly into the predetermined start ratio, said system comprising:

means for utilizing the highest ratio of said lowest grouping of ratios as the predetermined start ratio.

4. The system of claim 3 wherein said selection device (210) includes means (226, 228) for selecting upshifts and downshifts and said system parameters comprise signals indicative of selection of a downshift from a non-start ratio with the vehicle substantially at rest.

* * * * *